No. 656,358. Patented Aug. 21, 1900.
W. LIVINGSTONE.
WHEEL FOR CASTERS, &c.
(Application filed Jan. 24, 1900.)
(No Model.)
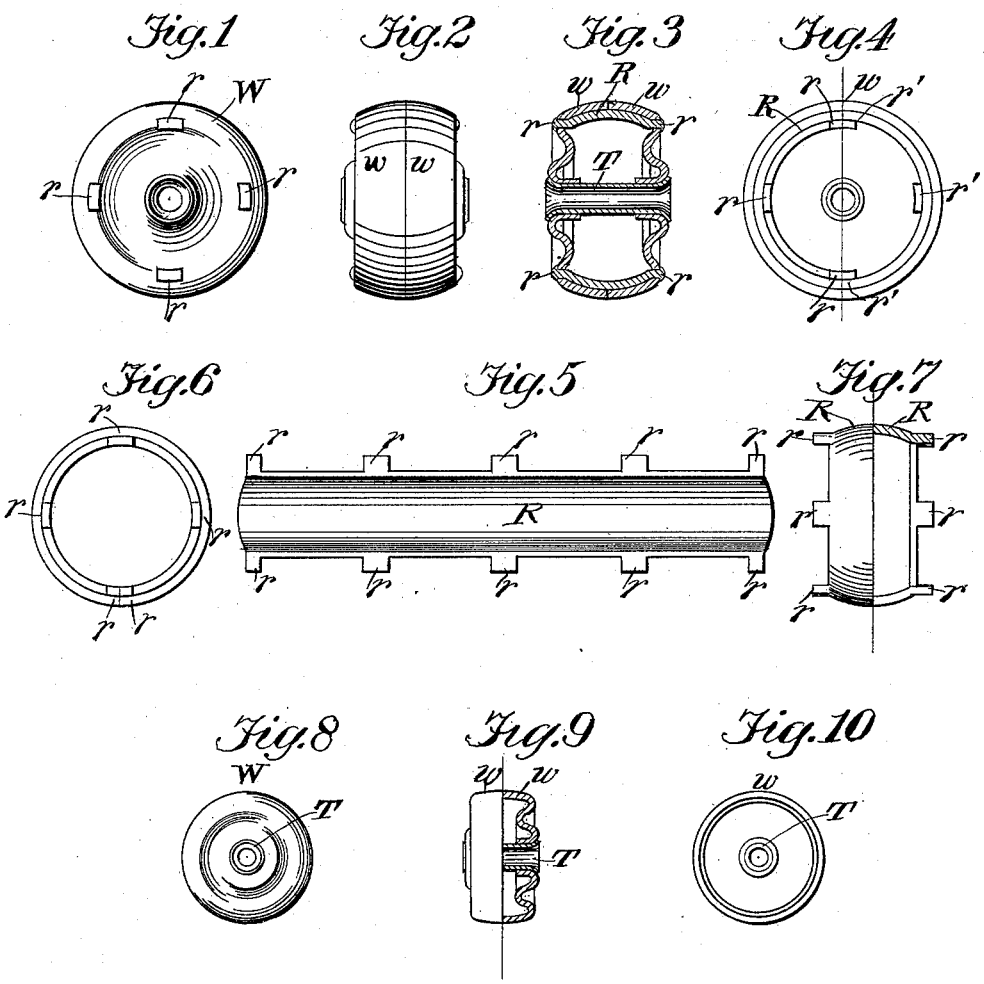

UNITED STATES PATENT OFFICE.

WILLIAM LIVINGSTONE, OF NEW YORK, N. Y., ASSIGNOR TO ROBERT MURRAY, TRUSTEE, OF SAME PLACE.

WHEEL FOR CASTERS, &c.

SPECIFICATION forming part of Letters Patent No. 656,358, dated August 21, 1900.

Application filed January 24, 1900. Serial No. 2,662. (No model.)

*To all whom it may concern:*

Be it known that I, WILLIAM LIVINGSTONE, a citizen of the United States, and a resident of New York, (Flushing,) borough of Queens, in the county of Queens and State of New York, have invented certain new and useful Improvements in Hollow Wheels for Casters and other Uses, of which the following is a specification.

My invention relates to an improvement in the construction of that class of caster or hanger wheels designated as "hollow wheels," being generally made in two cup-shaped sections from sheet-metal blanks by a stamping process and joined with their hollow portions communicating and fixed together in various manners.

However simple the process of stamping the two half shells or cups of a hollow wheel may be in itself, the different methods of fastening the same together have hitherto been either complicated and expensive or imperfect and unreliable. Moreover, it has been demonstrated by practical experience that it is impossible to draw the eyes or hubs in the center of these half-shells sufficiently deep to give anything more than a short and only partial bearing-surface upon the wheel-pin, which is very detrimental to the wheel on account of the greater wear and tear, whereas this invention refers to a wheel which in combination with a caster-horn for which Letters Patent have been granted to me under date of February 20, 1900, No. 643,719, is intended to produce a caster in which the usual cutting and shearing strain upon the wheel-pin shall be obviated or reduced to its minimum by providing the ends of the tube passing through the central eyes or hubs of the two half shells or cups with conical enlargements corresponding to the conical annular projections on the inner sides of the horn and integral therewith, whereby the conical end bearings of the wheel-tube will revolve upon these conical projections and transmit the weight and strain directly upon the shanks of the horn, while the cylindrical bearing of the wheel-tube upon the wheel-pin between the conical end bearings may be considered as secondary or auxiliary and free from all strain and friction.

The object of my invention is to produce a hollow wheel which shall combine the greatest possible strength and simplicity of assembling and locking with the lowest cost of production and the hitherto unattained feature of a complete journal-bearing for the whole length of the wheels axis, in such manner as to remove the weight and strain from the wheel-pin and transfer the same directly upon the shank of the horn.

The object of my invention and the method of construction, as hereinafter fully described, I attain by means of a tube passing through and being swaged out to fill the conical or tapering holes in the eyes of the half-shells, and thereby riveting the same closely together, while the hole in the tube will be the journal-bearing for the whole length of the wheel-pin—namely, conical at the ends and cylindrical between. For larger wheels carrying greater weight and requiring greater strength I employ in addition to the central tube a strengthening-ring provided with prongs, which passing through corresponding perforations in the sides of the half-shells and clenched outside of the same will not only hold the two half-shells tightly together near the line of their extreme periphery, but will give to the rims of the half-shells an additional thickness and support on their inner circumferences, as illustrated in the accompanying drawings, in which—

Figure 1 is an end view of wheel complete, showing the prongs of the strengthening-ring clenched on the outside. Fig. 2 is a front view of the same, showing the two half-shells joined together in the center line and the prongs of the strengthening-ring clenched on the outside. Fig. 3 is a central section of the same, showing the central tube passing through the eyes or hubs of the half-shells and clenched to correspond to the conical enlargement of the outer ends of the eyes and the strengthening-ring with its prongs passing through the perforated sides of the half-shells clenched on the outside. Fig. 4 is a plan view of interior of a half-shell, showing one-half of it with the strengthening-ring and the other half without it, the word "ring" being used herein in the sense of a peripheral strengthening-piece. Fig. 5 is a plan view of the blank from which the strengthening-ring is to be formed, showing position of prongs before it is bent. Fig. 6 is an end view of the strengthening-ring, showing the position of the prongs after it is bent. Fig. 7 is a half front view and half section of the same with prongs extending. Fig. 8 is an end view of a small wheel. Fig. 9 is a half front view and half section of the same, showing central tube passing through the eye and clenched against the conical enlargement thereof. Fig 10 is a plan view of a half-shell of the same.

Similar letters refer to similar parts throughout the several views.

W is the complete wheel. $w\ w$ are the two half-shells composing the same.

R is the strengthening-ring. $r\ r$ are the prongs of the same, and $r'\ r'$ are the corresponding perforations in the sides of the half-shells, and T is the central tube passing through the eyes of the half-shells.

Referring to the drawings, the wheel W consists of two half shells or cups $w\ w$, exactly alike, a central tube T passing through the eyes of the half-shells and clenched on the outside thereof against the conical enlargement of the eyes, whereby the two half-shells become firmly riveted together, and an inner strengthening-ring R, with prongs $r\ r$ fitting into and passing through corresponding perforations $r'\ r'$ in the sides of the half-shells and clenched on the outside thereof. The number of prongs and perforations will probably depend upon the size of the wheel, although I have preferred to make them four for the circumference of the wheel, as illustrated in the drawings.

What I claim as my invention, and desire to secure by Letters Patent, is—

1. A caster or hanger wheel consisting of two half-shells with perforations in their sides and a strengthening-ring provided with prongs in such position and of such dimensions as to correspond with and pass through and extend beyond the perforations of the half-shell to permit the same to be clenched and riveted against the sides of the half-shells and hold the same firmly together.

2. As a new and useful article of manufacture, a hollow caster or hanger wheel consisting of two cup-shaped half-shells having their peripheral edges toward each other and having central eyes or hubs projecting inwardly, the outer ends of which eyes or hubs are conically enlarged, a central tube T passing through the eyes or hubs and having its ends inwardly tapering at the place where the eyes or hubs taper for a sufficient distance to form conical bearings adapted to receive projections on the horns of a caster, and a cylindrical portion intervening between the conical enlargements, whereby there will be provided conical enlargements at the ends of the tube conformably to and corresponding with the conical projections of the caster-horn, thereby providing conical end bearings for the wheel directly upon the projections of the horn without strain upon the wheel-pin.

3. A hollow caster or hanger wheel consisting of two half-shells with their peripheral edges in contact and having inwardly-extending eyes or hubs with tapering bores adapted to receive and retain the cylindrical tube T having tapered ends, each of the said half-shells having perforations in its sides to receive lugs and a lugged strengthening member R located within the caster-wheel and having its lugs pass through the apertures in the sides of the half-shells and upset against the outer faces thereof.

Signed at New York city, in the county of New York and State of New York, this 29th day of November, A. D. 1899.

WILLIAM LIVINGSTONE.

Witnesses:
F. B. MULCOX,
Mrs. L. V. HANLEY.